Feb. 2, 1971  C. J. GUNTHER  3,560,038
LEVER ACTUATED FASTENER ASSEMBLY
Filed Dec. 18, 1968  2 Sheets-Sheet 1

INVENTOR
CONRAD J. GUNTHER
BY Daniel H. Kane
ATTORNEYS

Feb. 2, 1971   C. J. GUNTHER   3,560,038
LEVER ACTUATED FASTENER ASSEMBLY
Filed Dec. 18, 1968                                                    2 Sheets-Sheet 2
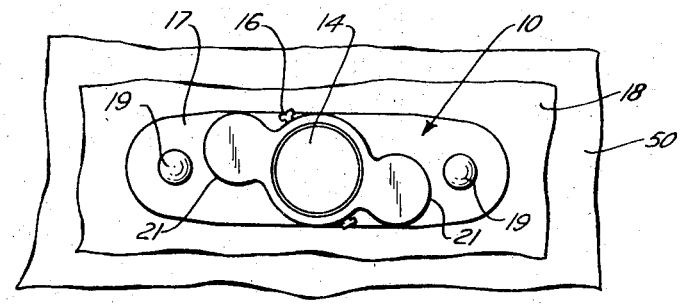
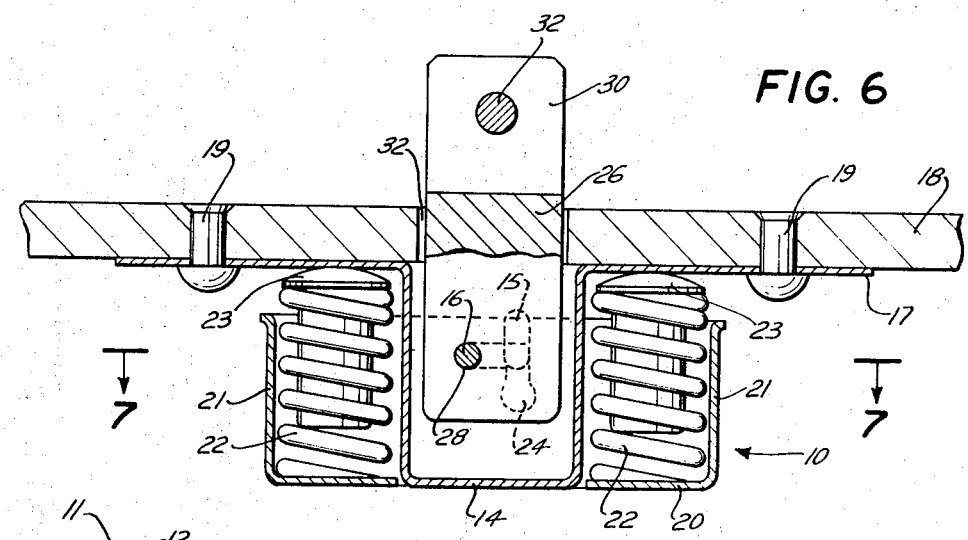
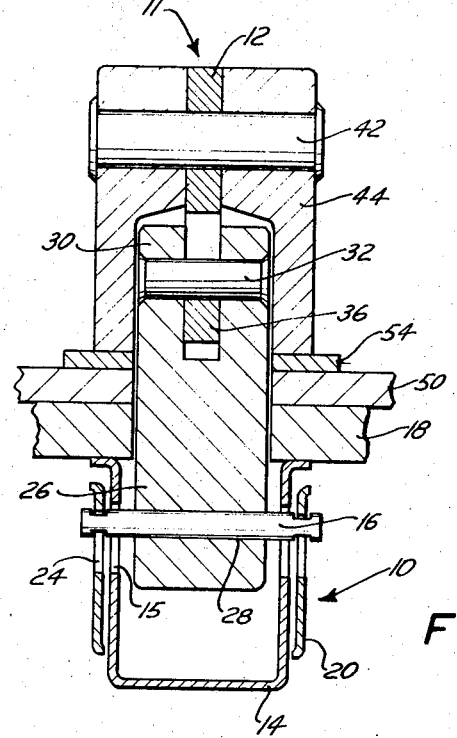
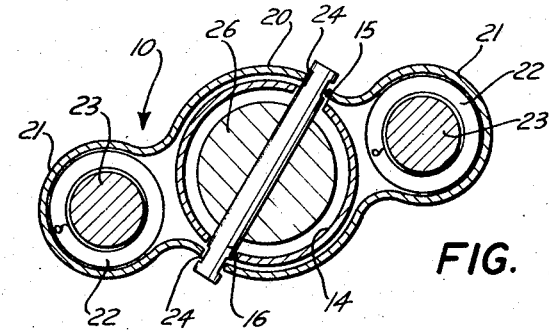
INVENTOR
CONRAD J. GUNTHER
BY Daniel H. Kane
ATTORNEYS

United States Patent Office 3,560,038
Patented Feb. 2, 1971

3,560,038
LEVER ACTUATED FASTENER ASSEMBLY
Conrad J. Gunther, Uniondale, N.Y., assignor to Dzus Fastener Co., Inc., West Islip, N.Y., a corporation of New York
Filed Dec. 18, 1968, Ser. No. 784,578
Int. Cl. E05c 3/04
U.S. Cl. 292—241
3 Claims

ABSTRACT OF THE DISCLOSURE

A fastener assembly which includes interengageable receptacle and operating handle members in which the receptacle member has a relatively fixed supporting base portion, a detent portion mounted on said base portion and spring means interposed between said base and detent portions with the detent portion being shiftable relative to the base portion from a normal position with the spring means being relatively expanded to a position where the spring means is relatively contracted. The operating handle member is in turn provided with an operating lever portion shiftable between open and closed positions and also with a cam portion projecting therefrom for engaging the detent portion when the lever is in open position with the detent portion being in relatively spring expanded position whereby when the operating lever is thereafter shifted to closed position the detent portion is in turn shifted to relatively spring contracted position thereby holding the assembly in closed or locked position and under spring tension.

BACKGROUND OF THE INVENTION

Quick-acting fastening devices of various types are known in the art. Thus certain quick acting fastening devices consist of a stud member and receptacle member which are releasably interengageable when rotated through an arc of 90°. These quick-acting, self-locking, rotatable fasteners have the disadvantage that when they are made for relatively high strength duty they require excessive locking and unlocking torque for their operation. This sometimes necessitates the use of special operating tools and, where the stud is provided with a screwdriver slot, the screwdriver slot becomes distorted and substantially unusable after repeated operations.

Another type of previously known fastener utilizes an operating lever which is pivoted upwardly and downwardly to open and close the fastener. These fasteners have frequently been unduly complicated in structure or they did not serve to secure the parts together under a high spring tension while providing a fixed limitation upon the separation permitted between the parts.

SUMMARY OF THE INVENTION

It is an object of the present invention to combine the advantages of the quick-acting, self-locking rotary fastener with the lever operated fastener and to provide a fastening device having separable receptacle and handle members wherein the locking and unlocking of the fastener is controlled by an operating lever which may readily be operated without the use of excessive force to either open or close the fastener.

It is a further object to provide a fastening device of the indicated type of relatively simple mechanical construction in which the parts are held while in closed position under relatively high spring tension and wherein the separation between the parts under load is held within predetermined limits.

The objects of this invention are accomplished by providing a fastener assembly comprising a receptacle member and a handle member. The receptacle member has a relatively fixed supporting base portion with a detent portion mounted on the base and spring means interposed between the base and detent portions whereby the detent portion can be shifted from a position with the spring means being relatively expanded to a position where the spring means is relatively contracted. The operating handle in turn is provided with an operating lever shiftable between open and closed positions and also with a cam portion projecting from the lever and arranged so that it can engage the detent portion when the lever is in open position whereby when the operating lever is shifted to closed position the detent portion is in turn shifted to relatively spring contracted position thereby holding the assembly in closed or locked position and under spring tension.

BRIEF DESCRIPTION OF THE DRAWINGS

In the accompanying drawings

FIG. 4 is a transverse sectional view in the direction of the arrows on the line 4—4 of FIG. 3;

FIG. 5 is a bottom plan view of the assembly, particularly showing the receptacle member;

FIG. 6 is a side view partially in section of the receptacle member; and,

FIG. 7 is a sectional plan view in the direction of the arrows of the line 7—7 of FIG. 6.

DETAILED DESCRIPTION OF THE PREFERRED EMBODIMENT

Figure 1:
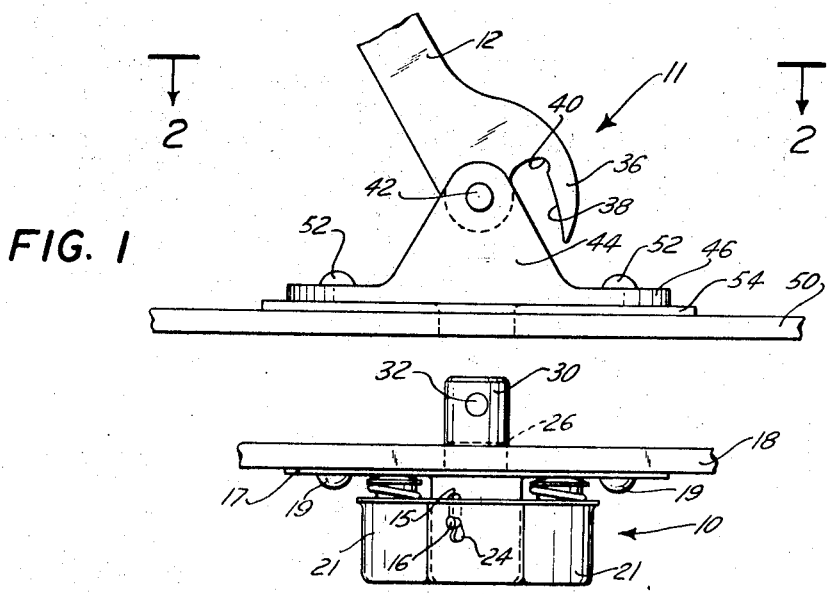
FIG. 1 is a side elevational view of a fastener assembly suitably mounted on supporting plates and showing the parts in open position.
Figure 2:
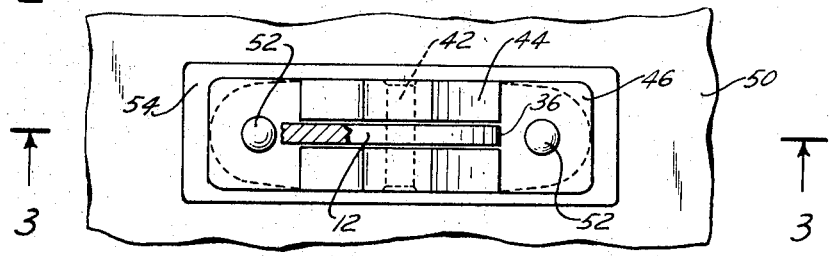
FIG. 2 is a top plan view of the fastener assembly in the direction of the arrows on line 2—2 of FIG. 1 with a portion broken away and with the upper portion of the operating lever shown in section.

The improved fastener assembly comprises a receptacle member 10 and a handle member 11 which are releasably interengageable with each other upon pivoting of the operating lever 12 of the handle member.

The receptacle member is of the type which has a detent portion which is normally urged towards open position by a spring mechanism and which may be engaged by the handle portion so as to be shifted against the tension of the spring to a closed position.

The illustrated embodiment comprises an inner shell 14 of cylindrical configuration having elongated longitudinally extending slots 15 on diametrically opposite sides thereof and through which the assembly pin 16 extends for longitudinal shift movements in the slots. The cylindrical shell portion 14 is integral with a mounting base plate 17 having apertures extending therethrough whereby the receptacle member may be secured to a part to be fastened such as the frame member 18 by means of rivets 19.

Assembled around the inner shell 14 is the outer shell 20 which is of lesser height than the inner shell and can have telescopic movement with respect thereto. The outer shell member 20 has a central aperture to accommodate the cylindrical portion 14 which also has a central generally cylindrical portion surrounding the cylindrical shell 14 and has lobe portions 21 at opposite ends thereof with closed outer ends and which serve as housings for the helical spring members 22. Assembled with the helical spring members are the bearing members 23 which engage the mounting plate 17. Thus the spring and bearing members exert a force between the inner and outer shells tending to shift them apart to relatively unlocked position. On diametrically opposite sides of the central portion of the outer shell 20 and in general alignment with the elongated slots 15 are the keyhole slots 24 which accommodate the reduced neck portions formed adjacent opposite ends of assembly pin 16 and thus serve to retain the two shells, the springs and assembly pin in assembled relationship.

Figure 3:
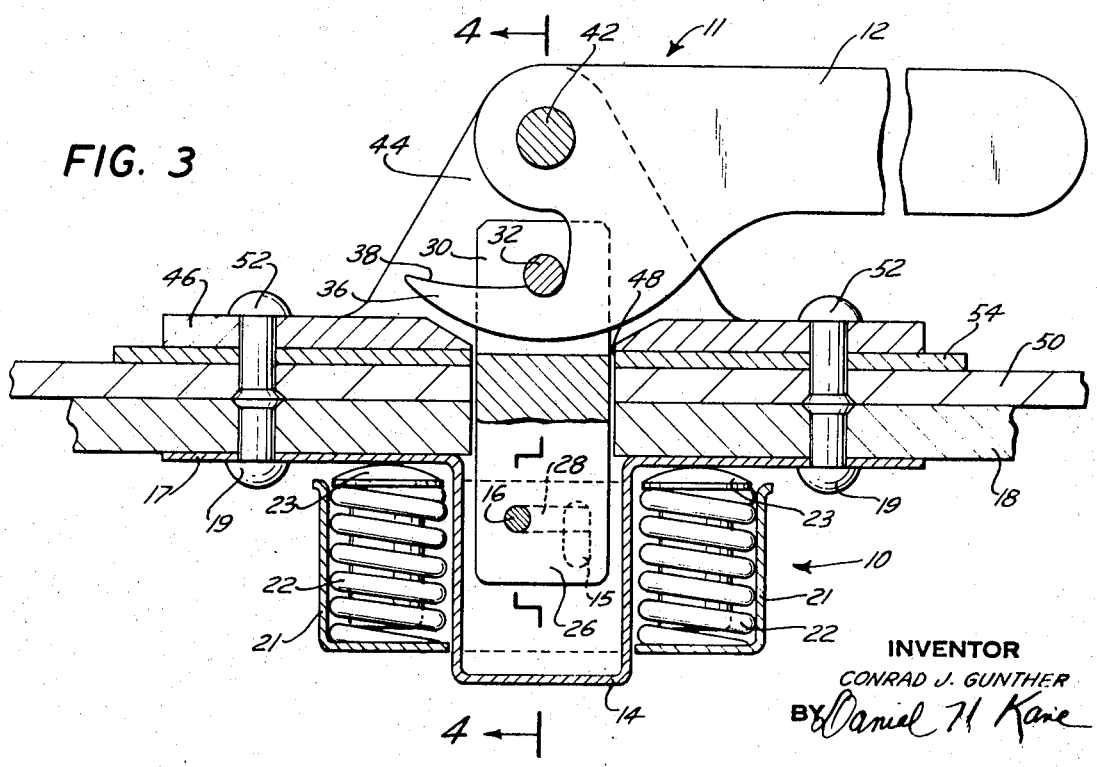
FIG. 3 is a partially sectional side view in the direction of the arrows on line 3—3 of FIG. 2 with portions of the operating lever omitted and showing the parts in closed positions.

The receptacle member also includes a detent portion which is directly interengageable with the handle member in the locking of the fastener. In the illustrated embodiment the detent portion includes the detent rod 26 having a diametrically extending aperture 28 near the lower portion thereof through which the assembly pin 16 extends and being bifurcated or split at its opposite end as shown at 30. A detent pin 32 is secured across the bifurcated or split upper end of the rod 26 as shown in FIGS. 3, 4 and 6.

In assembling the receptacle member the helical springs 22 and bearing members 23 are placed inside the spring housing 21 and the outer shell 20 is then telescoped over the inner shell 14. The lower end of detent rod 26 is then inserted through the open end of shell 14 and assembly pin 16 is inserted through keyhole slots 24 of the outer shell, elongated slots 15 of the inner shell and diametric aperture 28 extending through detent rod 26. In inserting the assembly pin it is necessary to telescope the outer shell 20 inwardly over the inner shell 14 sufficiently so that the assembly pin can be inserted through the lower enlarged end of one of the keyhole slots 14 thence through one of the elongated slots 15 and the diametrically disposed aperture 28 and finally through the opposite slots 15 and 14.

Thereafter when the compressive or telescopic force on the outer shell is released helical springs 22 expand to the position shown in FIGS. 6 and 7 with the reduced neck portions of the assembly pin 16 disposed in the reduced upper end portions of the keyhole slots and with the body of the assembly pin being disposed at the lower end of the elongated slots 15. This position represents the normal or unlocked position of the fastener receptacle. In its locked position the detent pin 32 and rod 26 are pulled outwardly from the inner shell pulling the assembly pin 16 and the outer shell 20 in a similar telescoping manner thereby causing partial compression of the helical springs 22.

In use, the base member 17 is placed against the face of a frame or supporting plate 18 having an aperture 32 in alignment with a central opening in shell 14 and also formed with a pair of rivet receiving mounting apertures in alignment with the mounting apertures in base plate 17. The receptacle can then be held in place as by rivets 19 extending through the mounting apertures.

The handle member 11 comprises the operating lever 12 which may be readily grasped in the hand and whereby the handle member may be shifted between open and closed positions. Integrally secured to the lever portion 12 and projecting forwardly therefrom is the cam portion 36 which generally tapers towards its forward end and is provided with a longitudinally concave cam surface 38 terminating at its inner end in the detent notch 40. The detent pin 32 is engageable by the cam surface 38 as the operating handle is shifted from open to closed position and in fully closed position the detent pin 32 is engaged in the detent notch 40.

The operating handle is pivotally mounted at a point between the lever and cam portions by pivot pin 42, extending between a pair of supporting standards 44, integrally formed with the supporting base plate 46. The base plate has a central aperture 48 for receiving the upper end of the detent rod 26 when the fastener is assembled and this aperture is positioned in substantial alignment with the pivot pin 42.

The operating handle assembly may be secured to the removable part, such as removable cover plate 50, as by means of rivets 52 extending through aligned apertures formed in the base plate 46 and in the cover plate 50.

A spacer plate of suitable thickness such as shown at 54 may be inserted between base plate 46 and cover plate 50 so as to provide the desired relationship between the cam surface 38 and the detent pin 32. Thus the spacing between the cam surface 38 and the detent pin 32, when the handle member and receptacle member are suitably mounted on the parts to be secured together, should be such that when the operating handle is in open position, as shown in FIG. 1 with the plate 50 in contact with the frame 18, the cam surface 38 will engage the detent pin 32 as the operating handle is shifted downwardly to closed position. As the operating handle is shifted to closed position the cam surface pulls the detent pin and detent rod 26 outwardly telescoping outer shell 20 with respect to inner shell 14 partly compressing the helical springs 22. When the operating handle is in fully locked position the detent pin 32 will engage with the detent notch 40, as shown in FIG. 3, with the result that the tensile force exerted by helical springs 22 on detent rod 26 serves to retain the parts in locked position. It will be seen when the parts are fully locked that the central longitudinal axis of rod 26 is either in substantial alignment with the centers of pins 32 and 42 also as shown in FIG. 3 or the axis of rod 26 and the center of pin 32 are positioned to the right of a vertical line intersecting the center of pin 42 as viewed in FIG. 3. Thus the force exerted by the springs serves to retain the assembly in locked position.

When the parts are thus locked together the assembly pin 16 will be positioned adjacent, but spaced from, the upper end of the longitudinal slots 15 formed in the diametrically opposite sides of shell 14. Thus the parts will be held together by the force exerted by the partially compressed springs 22. In addition separation between the parts is limited by the interengagement between detent pin 16 and the upper end of slots 15.

It will be appreciated that springs 22, with any desired compressive force, can be utilized. Where a very high locking force is desired, an operating lever of greater length may be provided so that the fastener may be readily locked and unlocked.

Thus, it will be seen that an improved fastener assembly has been provided in which the parts are locked together under spring tension, in which the separation between the parts is controlled or limited and which may be readily operated by means of a pivotally operating handle or lever.

Having now described the invention, I claim:

1. A fastener assembly for use in releasably fastening two parts together comprising:

a receptacle member for attachment to one of said parts having a relatively fixed supporting base portion including a first shell, a detent portion mounted on said base portion and including a second shell slidable telescopically with respect to the first shell and spring means interposed between the shells of said base and detent portions, said detent portion being shiftable relative to the supporting base from a normal position where the spring means is relatively expanded to a position where the spring means is relatively contracted; and, a cooperating operating handle member for attachment to the other of said parts and being interengageable with the receptacle member, said handle member having a mounting portion and an operating lever portion pivotally connected to the mounting portion and extending outwardly therefrom and being shiftable between open and closed positions, said operating lever being provided with a projecting arm portion having a cam surface formed therein and said cam surface being engageable with said detent portion when the operating lever is in open position so that when the operating lever is thereafter shifted to closed position the detent portion is in turn shifted to spring contracting position to thereby hold the two parts in assembled relationship and under spring tension.

2. A fastener assembly as set forth in claim 1 in which the detent member also includes a stud connected to the detent portion shell and formed with a detent pin which engages with the cam surface of the arm portion of the operating lever.

3. A fastener assembly as set forth in claim 2 in which the cam surface of the arm portion of the operating lever is formed with a locking recess at the inner end thereof for engagement with the detent pin when the operating lever is in closed position.

References Cited
UNITED STATES PATENTS

| | | | |
|---|---|---|---|
| 1,466,528 | 8/1923 | Holmes | 292—241 |
| 2,811,380 | 10/1957 | Osner et al. | 292—241X |

RICHARD E. MOORE, Primary Examiner

U.S. Cl. X.R.

292—341.17